United States Patent
Van Schaftingen

(10) Patent No.: US 6,808,673 B2
(45) Date of Patent: Oct. 26, 2004

(54) MULTI-LAYER HOLLOW BODY, METHOD FOR MANUFACTURING SUCH A HOLLOW BODY, AND COMPRESSION-BLOW-MOLDING MOULD

(75) Inventor: Jules-Joseph Van Schaftingen, Wavre (BE)

(73) Assignee: Inergy Automotive Systems Management (Societe Anonyme), Paris (FR)

( * ) Notice: Subject to any disclaimer, the term of this patent is extended or adjusted under 35 U.S.C. 154(b) by 0 days.

(21) Appl. No.: 10/695,740

(22) Filed: Oct. 30, 2003

(65) Prior Publication Data

US 2004/0089974 A1 May 13, 2004

Related U.S. Application Data

(63) Continuation of application No. 09/950,827, filed on Sep. 13, 2001, now abandoned.

(30) Foreign Application Priority Data

Sep. 14, 2000 (FR) .............................................. 00 11835

(51) Int. Cl.$^7$ .......................... B29C 49/02; B29C 43/20
(52) U.S. Cl. ....................... 264/512; 264/248; 425/501; 425/515
(58) Field of Search ............................... 264/512, 248; 425/501, 515

(56) References Cited

U.S. PATENT DOCUMENTS 6,328,842 B1 * 12/2001 Coninck et al. ......... 156/304.2

FOREIGN PATENT DOCUMENTS

| JP | 02/098542 A | * | 4/1990 |
| JP | 05-016938 A | * | 1/1993 |

* cited by examiner

Primary Examiner—Suzanne E. McDowell
(74) Attorney, Agent, or Firm—Stites & Harbison PLLC; B. Aaron Schulman

(57) ABSTRACT

A hollow body is formed from several multi-layer plastic elements which are welded together and comprise a barrier layer that is a barrier to liquids and to gases. The elements form an appendage which extends from an outer surface of the hollow body, wherein the appendage comprises two multi-layer plastic layers, each of the two layers having a respective barrier layer. A method for manufacturing the hollow body includes using compression moulding in a multi-part mould comprising welding kerbs. When the mould is being closed, at least the barrier layers of the multi-layer plastic elements are forced to flow into a shallow slot formed between the welding kerbs of the closed mould. A multi-part compression-blow-moulding mould comprises welding kerbs which, when the mould is closed, form a slot or space between them with a height of cross section that decreases towards the outside of the mould and which is extended by a shallow and broad slot intended to compress the plastic.

8 Claims, No Drawings

MULTI-LAYER HOLLOW BODY, METHOD FOR MANUFACTURING SUCH A HOLLOW BODY, AND COMPRESSION-BLOW-MOLDING MOULD

This application is a continuation of application Ser. No. 09/950,827, filed Sep. 13, 2001 now abandoned.

The present invention relates to a hollow body made of plastic of multi-layer polymeric structure.

Hollow bodies made of plastic of multi-layer polymeric structure have been developed to meet usage requirements which demand properties which cannot be conferred by a single thermoplastic. This technique has been used in particular when the issue is one or manufacturing hollow bodies made of plastic which have both high rigidity at ordinary temperature and good impermeability to liquids and gases they are intended to contain. In this case, the impermeability function is generally provided by a layer internal to the structure, of very small thickness and low mechanical strength, which is made of a material which behaves like a barrier to the liquids and gases contained in the hollow body.

One technique for producing hollow bodies made of plastic of multi-layer polymeric structure currently consists in assembling two or more elements of similar multi-layer structure, by welding.

We are also witnessing a significant reduction in the permissible amounts of liquid and vapour which can escape into the environment from containers containing organic substances. In the field of fuel tanks, new standards imposing extremely low levels of permissible losses will very soon come into force.

In hollow bodies manufactures as described above by assembling welded multi-layer elements, the region of the welding planes has lessened impermeability, given the crushing of the multi-layer structure in the plane of welding, which usually causes layers of one element to be folded down onto that of the welded element and the internal layer of each element to be welded to that of the other element. This then generally results in a discontinuity in the barrier layer of the structure of the hollow body produced, giving rise therefore to a preferred path for liquid and vapour leakages.

Japanese Patent Application No. JA-63/178931, which describes joining planes resulting from the assembly of multi-layer structures in which the ends of the barrier layers meet at a point inside the welded seam, is known.

The impermeability obtained with such joints is not, however, yet good enough to comply with the very low limits imposed by the new standards, given the difficulties there are in maintaining contact between the end or the barrier layers of each element along the entire length of the run of welding.

It is an object of the invention to provide a hollow body which has a level of permeability at the welding planes which is appreciably lower even than that obtained with the known methods based on a search for contact between the end of the barrier layers and which can meet the requirements imposed by the new environmental standards.

To this end, the invention relates to a hollow body made of plastic of multi-layer polymeric structure, comprising at least one internal barrier layer which is impermeable to gases and to liquids, in which body at least two elements of similar structure are welded together, characterized in that the welded elements are extended towards the outside of the hollow body by an appendage comprising the barrier layers.

"Hollow body" is intended to denote any structure, the surface of which has at least one empty or concave part. As a preference, the hollow body here denotes a closed structure intended to contain a liquid and/or a gas. Particular preference is given to reservoirs and tanks. The hollow body may have orifices pierced in its envelope and allowing communication with the external environment. In general, the hollow body has a maximum of 10 orifices. Tubes are usually excluded from the hollow bodies according to the invention.

"Plastic" is intended to denote any material containing at least one polymer. Thermoplastic polymers are preferred. The term "polymer" is intended to denote both homopolymers and copolymers (particularly binary or ternary ones). Examples of such copolymers are, without implying any limitations: random copolymers, copolymers from sequenced polymerization, block copolymers and graft copolymers.

The thermoplastic polymers also comprise thermoplastic elastomers and blends thereof.

Any type of thermoplastic polymer or copolymer whose melting point is below one breakdown temperature is suitable. Synthetic thermoplastics which have a melting range spread over at least 10° C. are particularly well-suited. Examples of such substances are those which have a polydispersion of their molecular mass.

In particular, the hollow body may contain polyolefins, graft polyolefins, thermoplastic polyesters, polyketones, polyamides and copolymers thereof.

A polymer often present in the hollow body is polyethylene. Excellent results have been obtained with high density polyethylene (HDPE).

A copolymer often used is the ethylene-vinyl alcohol (EVOH) copolymer. A blend of polymers or copolymers may also be used, as may a blend of polymeric substances with inorganic, organic and/or natural fillers such as, for example, but without implying any limitation: carbon, inorganic salts and other inorganic derivatives, natural or polymeric fibres.

According to the invention, the plastic of the hollow body is of a multi-layer polymeric structure. Such multi-layer structures consist of polymeric layers stacked and secured together containing at least one of the polymers or copolymers described above. They may be obtained using a coextrusion head or using a technique of completely or partially covering a substrate layer with one or more other layers. An example of the covering technique is the spraying of thermoplastic onto the substrate layer using a spray gun.

The hollow body according to the invention contains at least one barrier layer. This layer is on the inside of the multi-layer polymeric structure and therefore surrounded on both sides by at least one layer of plastic, the barrier properties of which are weaker. Usually, the layers situated on either side near a barrier layer have somewhat insignificant barrier properties.

"Barrier layer" means a layer which is impermeable to gases and to liquids. It generally contains a barrier resin. Any known barrier resin may be present in the hollow body, provided that it is effective with respect to the fluids likely to be in contact with this hollow body, particularly hydrocarbons, and provided that it is compatible with the technique used to manufacture the multi-layer structure.

Non-limiting examples of possible resins that may be mentioned are polyamides or copolyamides and random copolymers of ethylene and of vinyl alcohol. A blend of different barrier resins is also possible. Very good results have been obtained with a hollow body containing a barrier resin made of a random copolymer of ethylene and of vinyl alcohol.

According to the invention, the hollow body comprises at least two elements welded together. "Element" is to be understood as meaning any component or any part of a component of multi-layer polymeric structure, the shape of which has a flat surface or a surface at least part of which is concave. As a presence, the hollow body comprises a number of elements not exceeding 10. Particular preference is given to the hollow body comprising a maximum of 5 elements. A hollow body with two elements welded together has given excellent results.

According to the invention, the elements are of similar structure. What this means is that the structure of each of the elements comprises a number of layers differing from one another by no more than three units and, as a preference, by no more than two units, and that the natures of the polymers involved in the layers which correspond with one another on each side of the welding surface are compatible from the chemical point of view and from the point of view of their ability to be assembled by welding. Preference is given to a hollow body in which the elements have structures with the same number of layers. Particular preference is given to the hollow body in which the elements have identical structures. In this case, the elements of identical structure may come from different components. Alternatively, they may just as easily come from parts of one and the same component. This last situation is encountered when the elements come from parts of one and the same parison made of plastic of multi-layer structure.

The hollow body according to the invention comprises welded elements, that is to say elements assembled edge to edge and secured by welding. The elements may be welded along the entirety of their perimeter. Examples of this situation are hollow bodies consisting of distinct welded elements, and also hollow bodies consisting of a single parison gripped and welded along its entire periphery. In this situation, the hollow body elements according to the invention are generally welded over at least 80% of their perimeter. Another example of such hollow bodies are those which have at least one orifice situated in the perimeter of the welded elements. A preferred hollow body comprises elements welded along the entirety of their perimeter.

Alternatively, the elements may also be welded only over an insubstantial part of the perimeter of the hollow body. In the case of elements originating from a single parison, these elements may be welded only in two regions each near to one end of the parison. In this situation, the hollow body elements are generally welded over at least 5% of their perimeter.

According to the invention, the hollow body comprises welded elements which extend towards the outside of this hollow body. The extension originates near the weld between two elements and extends towards the outside in the form of an appendage which contains the barrier layers of each element.

This appendage forms an integral part of the hollow body of which it constitutes a functional part.

It may be in various forms. As a preference, its base anchored in the hollow body has a broader cross section than its end. It is often in the form of an outgrowth, of which the base, if sectioned on a plane perpendicular to the surface of the hollow body and to the welding kerbs, has a triangular cross section. It often terminates, at the end outside the hollow body, in a flattened blade containing the barrier layers.

The length of this appendage is such that the path to cross it between the barrier layers is long enough to reduce to a very low value the amount of liquid and/or gas that can pass through in a given time. As a preference, the appendage has a length of at least 0.2 mm. The "length" of the appendage is meant to mean the length of the line of intersection of the surface of one face of this appendage with a plane perpendicular to the surface of the hollow body and to the welding kerbs at a point centred on the base of the appendage. As a preference, the length of the appendage is at least 5 mm. Usually, this length does not exceed 60 mm. The length of the appendage does not have to be uniform at every point. An advantageous appendage is that one which is longer in certain particular regions of the surface of the tank, at points where there is no problem of space occupancy dictating compliance with a maximum size.

The welded elements are extended by an appendage over at least part of the exterior periphery of the hollow body.

As a preference, these welded elements are extended by an appendage over the entirety of the exterior periphery of the hollow body.

In addition to the barrier layers of each element, the appendage may also contain, in the hollow body according to the invention, at least one polymeric layer of a nature similar to that of one of the other layers present in each element, on any side of a barrier layer.

This layer of similar nature may be an external layer of one of the elements, internal or external to the hollow body. Alternatively, this layer may just as easily be one of the internal layers of one of the elements. As a preference, several layers of a nature similar to that of one of the other layers present in each element are to be found in the appendage. As a particular preference, the appendage contains, in addition to the barrier layers of each element, an even number of layers which correspond with one another in pairs in each element, these being arranged in the same sequence as in the element from which they originate. An advantageous variant of the appendage contains all the layers of each element.

The appendage may be arranged in any way with respect to the exterior surface of the hollow body. As a preference, it is folded down so as to reduce the space occupancy of the hollow body. An advantageous variant of the hollow body according to the invention is the one in which the appendage is folded down against the exterior surface of the hollow body. This fold is on any side of the weld, onto any one of the elements of the hollow body.

According to this variant, one possible hollow body is the hollow body in which the appendage is secured to the exterior surface of the hollow body against which it is folded down. Any type of securing is appropriate. One example of securing which has given good results is welding. In this case, the securing may be performed along the entire periphery of the hollow body. As a variant, it can just as easily be done only on a single or multiple part of this periphery. In the parts of the periphery of the hollow body where it is done, securing may also be effective over the entire surface of the appendage in contact with the hollow body. It may just as easily, as a variant, be performed only in a region near the end of the appendage.

The hollow body according to the invention is particularly well suited to forming a tank. More specifically still, it is well suited to containing a liquid and/or gaseous fuel.

The invention also relates to a method for manufacturing, using the compression-moulding technique, a hollow body made of plastic of multi-layer polymeric structure comprising a barrier layer that is a barrier to liquids and to gases, by welding at least two elements together, whereby:

a) the elements are inserted in an open multi-part mould, b) at least part of the ends of the elements which are to be assembled are gripped between the welding kerbs arranged at the periphery of at least two mould parts, so as to superpose them, c) the mould parts are pressed together so as to weld the elements together by closing the mould, and, at the same time, d) at least the barrier layers of the structure of these elements are forced to flow into a shallow and broad slot delimited by a space separating two mould parts near the welding kerbs and the cross section of which narrows at the end nearest the outside of the mould cavity, e) the mould parts are continued to be pressed together so as to form an appendage which emerges from the surface of the hollow body on the outside of the mould cavity, f) the mould is opened, g) the hollow body thus produced is extracted from the mould.

In this method, the terms which are common have the same meaning as those given above in the description of the hollow body.

The method according to the invention makes use of a multi-part mould. This mould has all the characteristics of the moulds conventionally used in the compression-moulding technique.

In this method, the "welding kerbs" are to be understood as being regions arranged at the periphery of part of a mould and capable of trapping and pressing together the corresponding edges of two elements that are to be welded, through collaboration with the corresponding peripheral region of another mould part when these parts are brought closer together by closing the mould.

According to a preferred variant of the method according to the invention, the elements are also shaped inside the mould. A choice method for performing this shaping consists in injecting a blow-moulding fluid into the mould so as to press the elements against the walls thereof. Any gaseous or liquid fluid is suitable, provided that it is compatible with the elements that are to be welded and with the material of which the mould is made. Pressurized air has given good results.

According to the method according to the invention, including in its variant described hereinabove, it is also possible, having opened the mould at the end of assembly, to fold the appendage down against the surface of the hollow body. This operation may be performed directly in the open mould, the hollow body still resting in a mould part. It may also be performed when the hollow body has been completely extracted from all the parts of the mould.

The appendage may also be secured to the exterior surface of the hollow body once it has been folded down against this surface. One securing method which has given good results is to weld the appendage to the exterior surface of the hollow body.

The length of the appendage may be left as obtained by manufacture. It may also be normalized to a certain value by trimming off any excess. In general, the appendage is not trimmed to shorter than a length of 0.2 mm. As a preference, this appendage is not trimmed to shorter than 5 mm in length.

The method according to the invention, including all its variants, is very suitable for producing a fuel tank made of plastic of multi-layer polymeric structure.

The invention finally relates to a compression-blow-moulding mould formed of at least two distinct parts comprising, at their periphery, welding kerbs capable of gripping and welding distinct elements made of plastic of multi-layer polymeric structure, in which the welding kerbs of two mould parts facing one another leave between them, when the mould is closed, a space the height of the cross section or which decreases towards the outside of the mould cavity and is extended by a shallow and broad slot intended to greatly compress the plastic while the mould is being closed.

In this mould, the terms which are common have the same meaning as the meaning given above in the description of the hollow body.

What is claimed is:

1. A method for manufacturing, using a compression-moulding technique, a hollow body formed by at least two elements each of which is made of a multi-layer polymeric material comprising a barrier layer which provides a barrier to liquids and to gases, and comprising at least one other polymer layer, said method comprising:

a) inserting the elements into an open mould comprising at least two distinct mould parts, each mould part comprising, at its periphery, a welding kerb, said welding kerbs of the two mould parts facing one another and forming a space between the two mould parts when the mould is closed, the space delimiting a shallow and broad slot and having a cross section which narrows towards the end which is the farthest away from the hollow body;

b) gripping at least part of the ends of the elements between the welding kerbs so as to superpose the ends of the elements;

c) compressing the mould parts so as to weld the ends of the elements together by closing the mould, and, at the same time, to force at least the barrier layers to flow into the shallow and broad slot;

d) continuing to compress the mould parts so as to form an appendage inside the shallow and broad slot which emerges from the surface of the hollow body;

e) opening the mould; and f) extracting the hollow body, which comprises on its exterior surface one or more appendages, from the mould.

2. The method according to claim 1, wherein the elements are also shaped inside the mould by injecting a blowing fluid into the mould so as to press the elements against the walls of the mould.

3. The method according to claim 1, wherein the elements are welded only over a part of the perimeter of the hollow body.

4. The method according to claim 1, wherein after opening the mould, said method further comprises folding the appendage down against the exterior surface of the hollow body.

5. The method according to claim 1, wherein after opening the mould, said method further comprises securing the appendage to the exterior surface of the hollow body.

6. The method according to claim 1, wherein after opening the mould, said method further comprises folding the appendage down against the exterior surface of the hollow body, and securing the appendage to the exterior surface of the hollow body.

7. The method according to claim 1, wherein said hollow body forms a fuel tank.

8. A compression-blow-moulding mould having a mould cavity and formed of at least two distinct mould parts, each mould part comprising, at its periphery, a welding kerb capable of gripping and welding distinct elements made of a multi-layer polymeric material, wherein the welding kerbs of the two mould parts facing one another form a space between the two mould parts, when the mould is closed, the space having a cross section which narrows towards the end which is the farthest away from the hollow body and delimiting a shallow and broad slot intended to compress the multi-layer polymeric material when the mould is being closed.

* * * * *